United States Patent
Godley

(10) Patent No.: US 9,410,465 B2
(45) Date of Patent: Aug. 9, 2016

(54) ADHESIVE PARTICLE FILTER/TRAP FOR PRESSURIZED HEAT ENGINES

(71) Applicant: Stuart Godley, Kfar Baruch (IL)

(72) Inventor: Stuart Godley, Kfar Baruch (IL)

(73) Assignee: QNERGY LTD., Ein-Harod Ihud (IL)

( * ) Notice: Subject to any disclaimer, the term of this patent is extended or adjusted under 35 U.S.C. 154(b) by 41 days.

(21) Appl. No.: 14/101,433

(22) Filed: Dec. 10, 2013

(65) Prior Publication Data
US 2015/0159534 A1   Jun. 11, 2015

(51) Int. Cl.
*F01N 5/02* (2006.01)
*B01D 39/16* (2006.01)
*F01N 3/022* (2006.01)

(52) U.S. Cl.
CPC .............. *F01N 5/02* (2013.01); *B01D 39/1623* (2013.01); *F01N 3/022* (2013.01); *Y02T 10/20* (2013.01)

(58) Field of Classification Search
CPC ........... B01D 45/08; B65D 84/86; C09J 7/02; H05K 5/0213; Y10T 428/2848; Y10T 428/28; F01M 5/021; B29C 70/08; B60N 3/048; B60K 15/035; B60H 1/034
USPC ........ 55/465, 524, DIG. 14; 95/285; 428/343, 428/354, 85; 206/701, 706, 726; 123/142.5 E, 516; 219/202
See application file for complete search history.

(56) References Cited

U.S. PATENT DOCUMENTS

| | | | | |
|---|---|---|---|---|
| 4,340,402 A | * | 7/1982 | Catron | 55/487 |
| 5,017,758 A | * | 5/1991 | Kirkman | F01M 5/021 123/142.5 E |
| 5,338,340 A | * | 8/1994 | Kasmark et al. | 96/135 |
| 5,811,184 A | * | 9/1998 | Anderson et al. | 428/343 |
| 6,051,302 A | * | 4/2000 | Moore | B29C 70/08 239/265.19 |
| 6,634,342 B1 | * | 10/2003 | Wouters | B60K 15/035 123/516 |
| 7,473,301 B2 | * | 1/2009 | Klebanoff et al. | 95/285 |
| 7,727,915 B2 | * | 6/2010 | Skirius et al. | 442/389 |
| 2003/0096079 A1 | * | 5/2003 | Messina | B60N 3/048 428/85 |
| 2004/0112884 A1 | * | 6/2004 | Uhl | B60H 1/034 219/202 |
| 2006/0137313 A1 | * | 6/2006 | Simon | B01D 46/0056 55/400 |
| 2014/0262633 A1 | * | 9/2014 | Kunzler | F16D 65/0031 188/72.1 |

* cited by examiner

*Primary Examiner* — Duane Smith
*Assistant Examiner* — Minh-Chau Pham
(74) *Attorney, Agent, or Firm* — Dekel Patent Ltd.; David Klein

(57) ABSTRACT

A filter assembly includes an adhesive layer disposed, coated or otherwise mounted on interior surfaces of a pressurized heat engine, and located in a gas flow path through the engine.

11 Claims, 1 Drawing Sheet

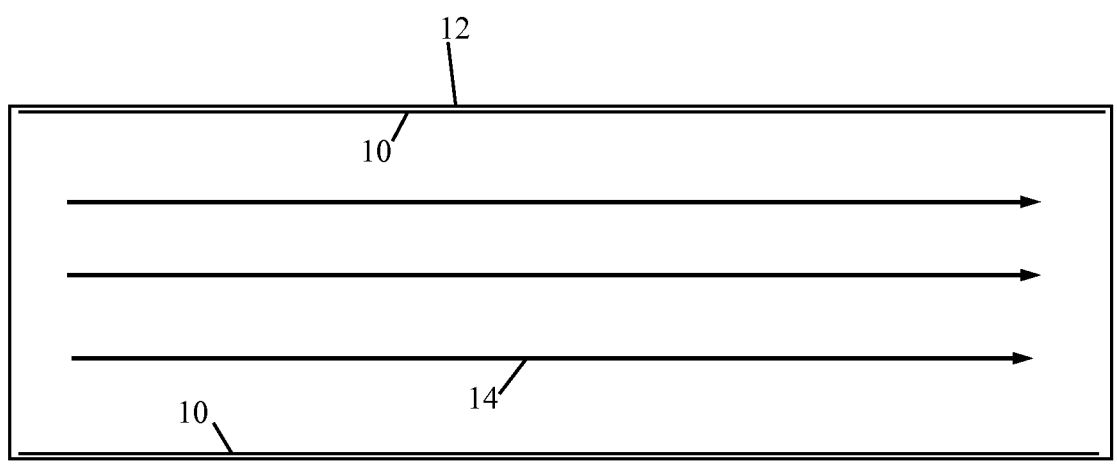

ADHESIVE PARTICLE FILTER/TRAP FOR PRESSURIZED HEAT ENGINES

CROSS-REFERENCE TO OTHER APPLICATIONS

This application claims priority from U.S. Provisional Patent Application 61/735,079, filed Dec. 10, 2012.

FIELD OF THE INVENTION

The present invention relates generally to filters for pressurized heat engines, and particularly to an adhesive filter/trap for a Stirling engine.

BACKGROUND OF THE INVENTION

Although great effort is taken to ensure sterility during assembly of pressurized heat engines, particularly Stirling engines, there are inevitably unwanted small to microscopic free particles present in this hermetically sealed environment. Once the engine is initially operated, these particles, traveling in the gas stream of the engine, find their way into microscopic gaps and orifices causing excessive wear and premature failures.

SUMMARY OF THE INVENTION

The present invention seeks to provide a novel adhesive filter/trap for a pressurized heat engine, particularly Stirling engines, as is explained more in detail hereinbelow. The invention is intended to behave as a filter to remove undesirable particles from the gaseous interior space of pressurized heat engines when they contact the adhesive and remain embedded in it, such as Stirling engines.

There is thus provided in accordance with a non-limiting embodiment of the invention a filter assembly including an adhesive layer disposed, coated or otherwise mounted on interior surfaces of a pressurized heat engine, and located in a gas flow path through the engine.

BRIEF DESCRIPTION OF THE DRAWINGS

The present invention will be understood and appreciated more fully from the following detailed description taken in conjunction with the drawings in which:

FIG. 1 is a simplified illustration of a filter assembly for a pressurized heat engine, constructed and operative in accordance with an embodiment of the present invention.

DETAILED DESCRIPTION OF EMBODIMENTS

Reference is now made to FIG. 1, which illustrates a filter assembly 10 for a pressurized heat engine 12, constructed and operative in accordance with a non-limiting embodiment of the present invention.

Filter assembly 10 includes an adhesive layer disposed, coated or otherwise mounted on interior surfaces of the engine 12, and located in a gas flow path 14 through the engine. The adhesive is preferably capable of withstanding elevated pressures in an inert gas environment (up to 50 atmospheres or more) and relatively high temperatures (up to 85° C. or more), and has excellent resistance to peeling, wherein it retains its adhesiveness for the life of the machine. "Withstanding" or "retaining" means its adhesive properties are not significantly degraded, such as not more than a 10% degradation in adhesive properties, or alternatively not more than a 25% degradation in adhesive properties. Examples of such an adhesive include, but are not limited to, flytrap adhesives. The adhesive may be applied by coating, including painting, spraying, brushing, dipping, etc. Alternatively, the adhesive may include adhesive tape or material supplied as a roll. As another alternative, the adhesive may be an adhesive pad, strip or thin structure and the like, bonded to the required surfaces.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A filter assembly for a pressurized heat engine comprising:
    an adhesive layer disposed, coated or otherwise mounted on interior surfaces of a pressurized heat engine, and located in a gas flow path through said engine.

2. The filter assembly according to claim 1, wherein said adhesive layer comprises an adhesive coating.

3. The filter assembly according to claim 1, wherein said adhesive layer comprises adhesive tape.

4. The filter assembly according to claim 1, wherein said adhesive layer comprises an adhesive thin structure.

5. The filter assembly according to claim 1, wherein said adhesive layer is capable of withstanding elevated pressures up to at least 50 atmospheres in an inert gas environment.

6. The filter assembly according to claim 1, wherein said adhesive layer is capable of withstanding high temperatures at least up to 85° C.

7. The filter assembly according to claim 1, wherein said adhesive layer retains its adhesiveness for a life of said engine.

8. A method for removing undesirable particles from a gaseous interior space of a pressurized heat engine comprising:
    having an adhesive layer disposed, coated or otherwise mounted on interior surfaces of a pressurized heat engine, and located in a gas flow path through said engine; and
    operating said engine such that a gas stream that includes undesirable particles flows through said gas flow path, wherein said undesirable particles contact said adhesive layer and remain embedded in said adhesive layer.

9. The method according to claim 8, wherein said adhesive layer is capable of withstanding elevated pressures up to at least 50 atmospheres in an inert gas environment.

10. The method according to claim 8, wherein said adhesive layer is capable of withstanding high temperatures at least up to 85° C.

11. The method according to claim 8, wherein said adhesive layer retains its adhesiveness for a life of said engine.

* * * * *